US008823643B1

(12) United States Patent
Biswell

(10) Patent No.: US 8,823,643 B1
(45) Date of Patent: Sep. 2, 2014

(54) OPTICAL COMPUTER INPUT CONTROLLER DEVICE

(76) Inventor: Bill Biswell, Houston, TX (US)

( * ) Notice: Subject to any disclaimer, the term of this patent is extended or adjusted under 35 U.S.C. 154(b) by 101 days.

(21) Appl. No.: 13/543,962

(22) Filed: Jul. 9, 2012

(51) Int. Cl.
*G09G 5/00* (2006.01)

(52) U.S. Cl.
USPC .......................................... 345/156; 345/173

(58) Field of Classification Search
CPC . G06F 19/327; G06F 19/3462; G06F 3/0425; G06F 3/0488; G06F 2203/04108; G06F 2203/04809; G06F 3/0312; G06F 3/03545
USPC ........................... 345/156, 169, 166, 173, 175
See application file for complete search history.

(56) References Cited

U.S. PATENT DOCUMENTS

| 5,334,997 A | 8/1994 | Scallon |
| 5,367,315 A | 11/1994 | Pan |
| 5,838,305 A | 11/1998 | Bookstein |
| 7,145,520 B2 | 12/2006 | Ramanujan |
| 7,369,116 B2 | 5/2008 | Logue |
| 7,454,309 B2 | 11/2008 | Lawrence et al. |
| 7,554,526 B2 | 6/2009 | Logue |
| 2006/0125795 A1 | 6/2006 | Medina |
| 2006/0152494 A1* | 7/2006 | Liess .............................. 345/169 |
| 2011/0134064 A1* | 6/2011 | Goertz ........................... 345/173 |

* cited by examiner

*Primary Examiner* — Duc Dinh
(74) *Attorney, Agent, or Firm* — Harpman & Harpman

(57) ABSTRACT

An integrated computer optically controlled switching interface activated by detecting positional movement of a user's hands or feet or other body part within a perimeter optical sensor defined area. The controller includes a confinement pad, a pair of angularly disposed perimeter rails interconnected by an end rail between optical sensor transmission and receiving towers for rail aligned interface beam generation and associated circuit support within said housing.

7 Claims, 4 Drawing Sheets

OPTICAL COMPUTER INPUT CONTROLLER DEVICE

BACKGROUND OF THE INVENTION

1. Technical Field

This invention relates to computer interface controllers such as computer optical mouse and tracking devices to allow user access and control of electronic computer devices independently or in addition to a keyboard and mouse.

2. Description of Prior Art

Prior art devices of this type have been directed to a variety of controller interfaces; see for example U.S. Pat. Nos. 5,334,997, 5,367,315, 5,838,305, 7,145,520, 7,369,116, 7,454,309, 7,554,526 and U.S. Publication 2006/0125795.

In U.S. Pat. No. 5,334,997, a foot operated input device for computers can be seen having a dual housing, each with a track ball positioned therewithin.

U.S. Pat. No. 5,367,315 is directed to an infrared light based system allowing user to input control by head or eye movement detected.

U.S. Pat. No. 5,838,305 illustrates a foot operated computer control mechanism wherein the computer cursor responds to movements of the operator's foot which rests on a movable platform on a YX axis rails for movement therealong.

U.S. Pat. No. 7,145,530 claims a pointing device for use with a computer to control a pointer on the screen by a tracking device.

U.S. Pat. No. 7,145,550 is directed to a method and apparatus to reduce repetitive motion injuries by utilizing a tracking device incorporated into two apparatus that are separately operable for multiple user inputs, such as by fingers, foot or eyes.

U.S. Pat. No. 7,454,309 claims a foot activated interface via a foot mounted position sensor having a light source to determine the relative position thereof.

U.S. Pat. No. 7,554,526 describes a foot activated data entry pad having multiple activation buttons similar to inventor's 116 patent, noted above.

Finally, in U.S. Patent Publication 2006/0125795 a controller computer mouse can be seen having movable foot engagement portions on a base having integrated sensors to determine the movable position relative a fixed position thereto.

SUMMARY OF THE INVENTION

A sensor input device providing a user interface with a computer by using a universal activation input venue that employs multiple pairs of spaced adapted optically sensor beams positioned in a housing that determines and detects user movement parameters therewithin. Proprietary software drives the beam interface controller via six optical sensored switches as triggers that are usable and configurable for specific program applications that they are intended to control. Multiple configurations can be saved and recalled at the discretion of the user. The system apparatus enables handicapped individuals to utilize a computer interface by a variety of different user directed body parts or controlled elements associated therewith.

DETAILED DESCRIPTION OF THE INVENTION

Figure 1:
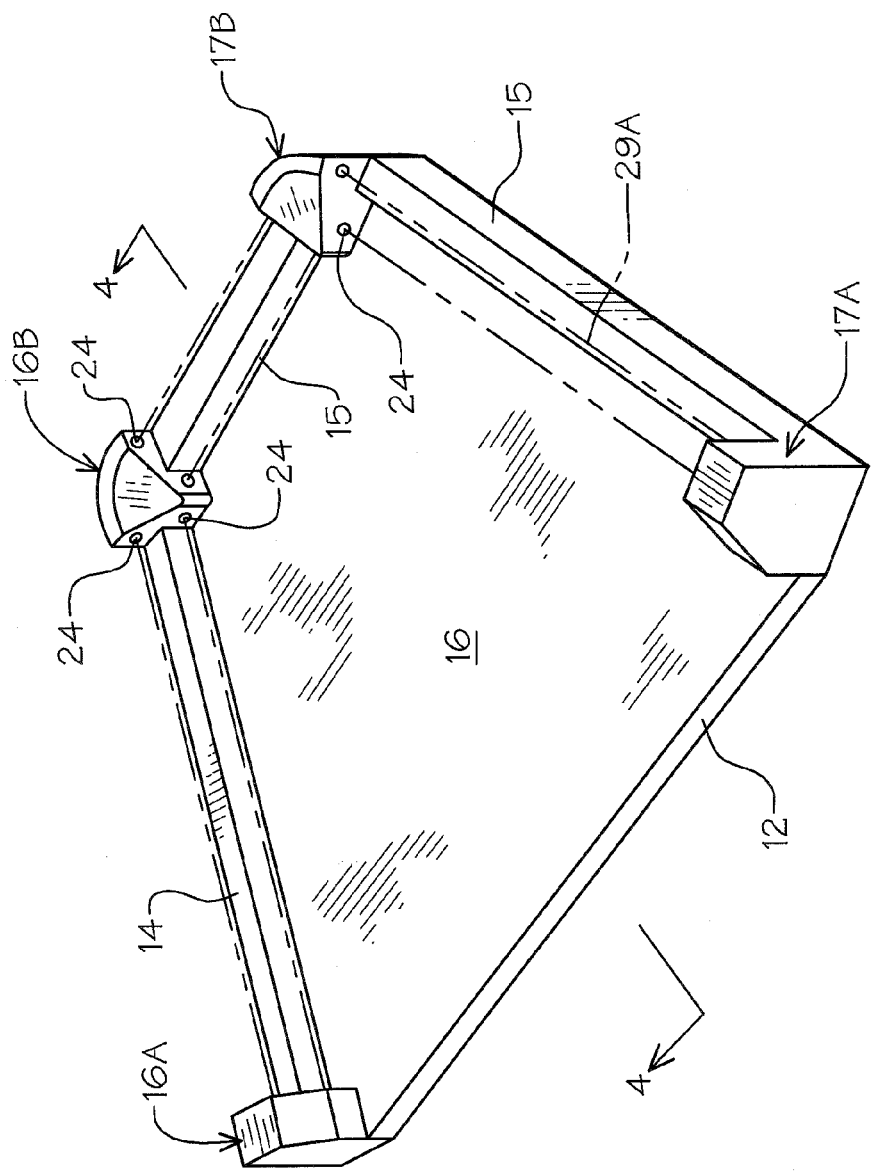
FIG. 1 is a perspective view of the interface input controller of the invention.
Figure 2:
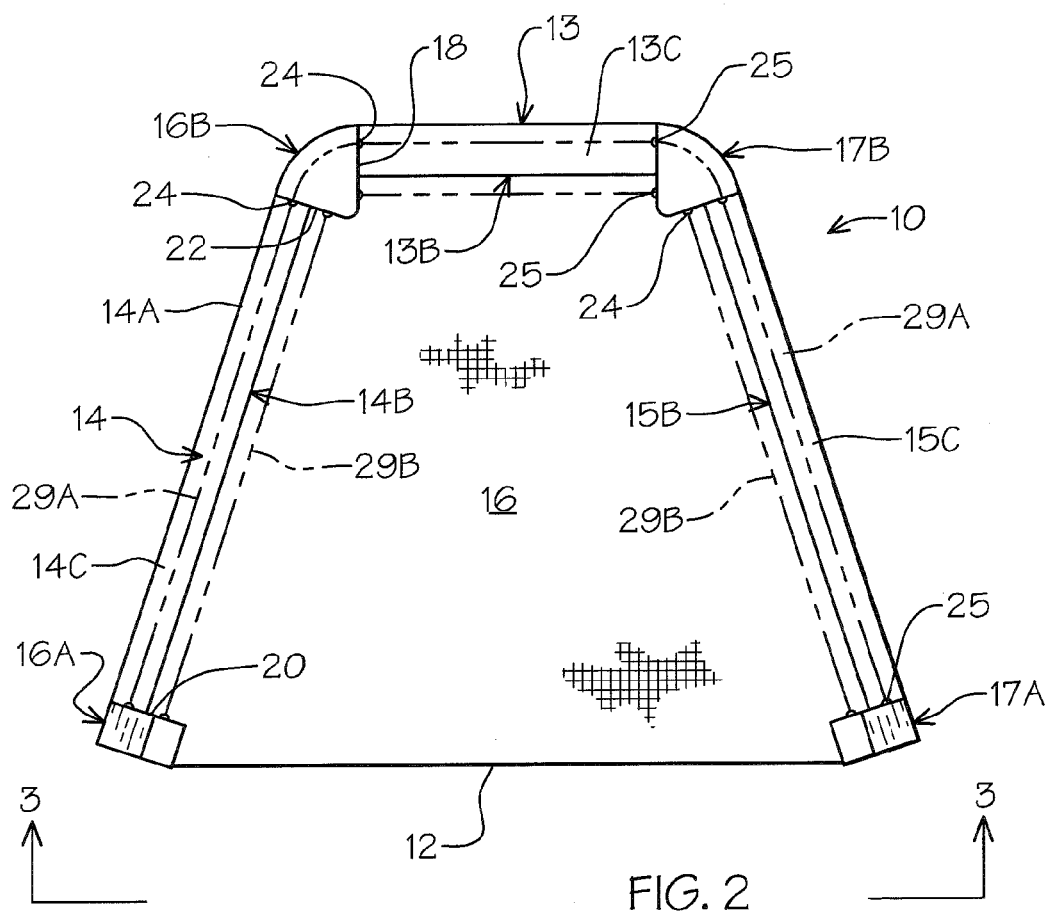
FIG. 2 is a top plan view thereof including sensor beams shown in broken lines for illustration.
Figure 3:
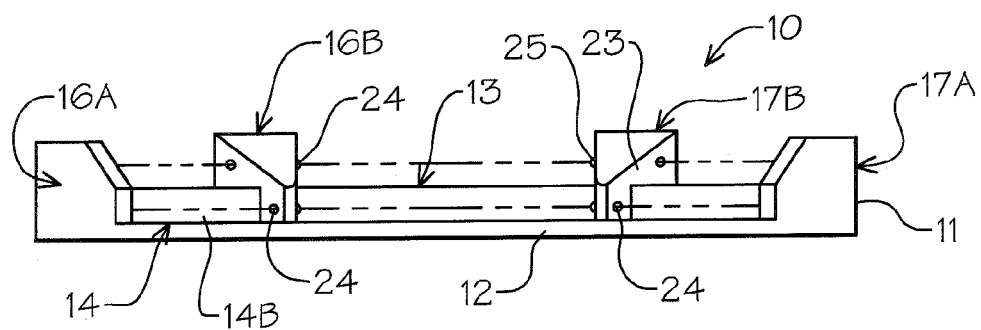
FIG. 3 is a front elevational view thereof on lines 3-3 of FIG. 2.

Referring to FIGS. 1-3 of the drawings, an optically controlled switching system 10 of the invention can be seen having a housing 11 with parallel spaced front edge 12 and rear rail 13. A pair of angularly oriented spaced perimeter side rails 14 and 15 extend from an interconnect to the respective front edge 12 and the rear rail 13 defining a user engagement surface area 16 therebetween as best seen in FIG. 2 of the drawings. The respective side rails 14 and 15 each have integrated raised beam sensor enclosures 16A, 16B, 17A and 17B at their respective ends with sensor enclosures 16A and 17B interconnecting the corresponding side rails 14 and 15 with the hereinbefore described rear rails 13. The respective side rails 14 and 15 and rear rail 13 are defined by their upstanding respective outer side surfaces 14A and 15A and 13A with spaced opposing inner parallel inner side surfaces 14B, 15B and 13B. Each of the rails 13-15 have respective elongated flat top surfaces 14C, 15C and 13C interconnecting same. The raised sensor enclosures 16B and 17B are identical having respective angular effacing end surfaces 18 and 19 which define optical beam sensor transmission and receiver placement areas in spaced aligned orientation overlying the rear wall's flat top 13C and corresponding inner wall side surface 13B.

Accordingly, each of the identical respective beams enclosures 16A and 17A at the respective ends of the side rails 14 and 15 have respective sensor placement surfaces 20 and 21 which are in perpendicular alignment with the wall's sensor enclosures 16B and 17B corresponding effacing end surfaces 22 and 23. It will be evident from the above description that each of the hereinbefore defined housing perimeter rails 13-15 have therefore effacing sensor mounting surfaces both overlying their respective flat top surfaces 13C, 14C and 15C and in spaced front alignment of their respective inner rail surfaces 13B, 14B and 15B.

Multiple infrared beam generators 24 and oppositely disposed aligned optical receivers 25 are positioned within the respective aligned sensor enclosure end surfaces 18, 19, 20 and 21 as hereinbefore described.

Figure 6:
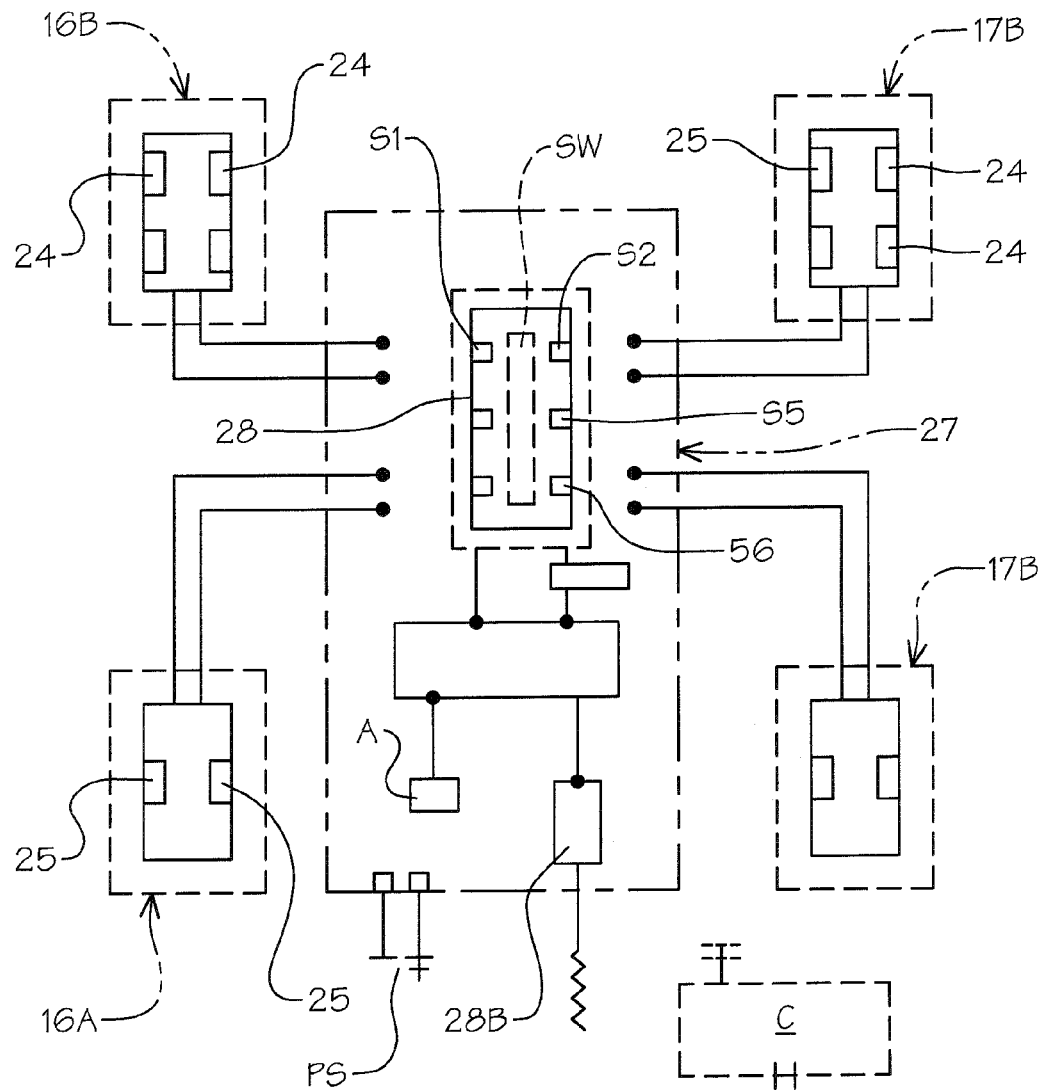
FIG. 6 is a graphic circuit control illustration for multiple sensors and associated electronically generated switch and computer connection interface.

An electronic power and control interface circuit 26 generally illustrated in FIG. 6 of the drawings is enabled on a circuit board 27 indicated by broken lines within the housing 11 having a program control and command IC chip 28 with appropriate supportable known circuit elements including a wired 28A or wireless 28B output and transmitter ports to interconnect with a computer C, illustrated only for reference.

A power source PS may be any portable or power line configured dependent user venue orientation.

As illustrated, the infrared beam generators 24 create multiple sensor beams 29 in spaced pairs 29A and 29B overlying the respective flat top wall surfaces 13C-15C and inner wall surfaces 13B-15B of the of the herein described walls 13-15 defining bi-level elevated contact beams interface therebetween as graphically illustrated and indicated by multiple broken lines.

Figure 4:
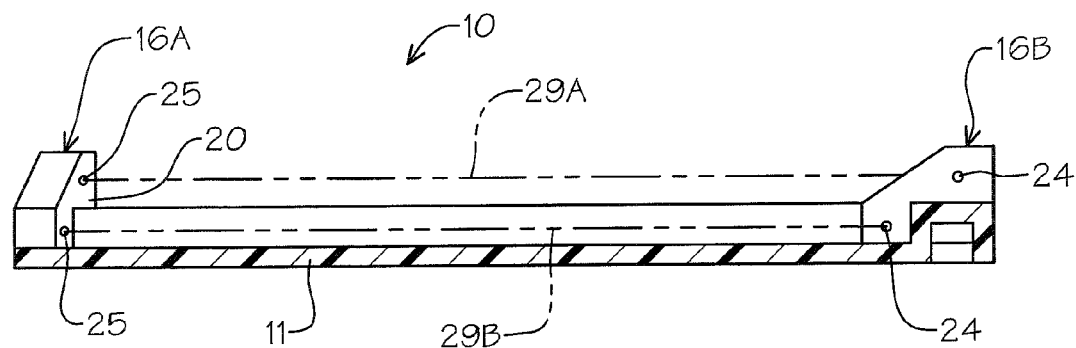
FIG. 4 is a sectional view on lines 4-4 of FIG. 1.

It will also be seen that multiple sensor beams 29B define a lower contact beam border in front of the respective inner side surfaces 13B, 14B and 15B indicated and best seen in FIGS. 2, 3 and 4 of the drawings.

Figure 5:
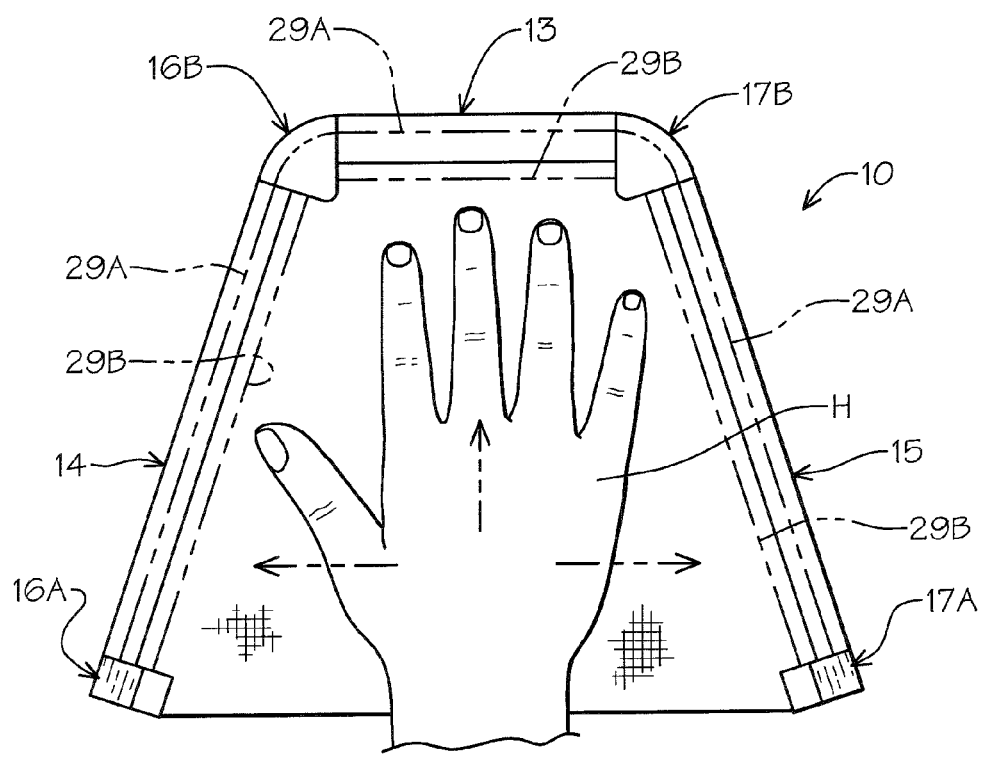
FIG. 5 is a top plan view of the interface with a user hand illustrated position therewithin for operational activation.

In this preferred form, each of the sensor beam pairs 29A and 29B control through an electric circuit C defining corresponding electronic switches S1-6 as seen graphically in FIG. 6 of the drawings. It will thus be evident that when each of the generated sensor beam pairs 29A and 29B is broken by the user's as seen in FIG. 5 of the drawings in which one of the optical sensor beams 29B has been interrupted by the user's hand H, specifically their thumb T, for example. The circuit defined switch S4 in this illustration will be activated and the programmed assigned action within the program will be enabled.

A proprietary computer software SW program supplied with the controlled switch system 10 will allow switch enablement assignment apparatus to implement applications to which it is applied. Given the multiple defined optical sensor beam's vertical orientation levels to one another, identical user's actions at different levels within the engagement surface area 16 will interact with so provided optical beams for different assignment actions within the defined program. Giving the spacing and relationship of the optical beam locations hereinbefore described in their respective angled side rails 14 and 15 and interconnected rear rail 13, any number of user implemented tactile aids could be effectively directed by the user to engage and therefore interrupt the specific optical beam so chosen. It will also be seen that in some applications, different user body parts could be used wherein a user's primary task enablement means, such as their hands, are disabled. In such applications, the user's implementation can be indicated by indicia generated by software wherein alpha numeric representations are used and audio induced text to speech is so indicated, could be implemented as an indicator element within the parameters of the application controller.

As noted, the proprietary software program indicated at SW enables the controlled switching system 10 of the invention to be used as a stand alone input interface device by emulating keystrokes of a keyboard or a portion of a mouse addition to a real keyboard and/or mouse (not shown) for example to control the computer program as it is applied thereto.

While the software will have a variety of additive action use configurations, capable of multiple inputs with the critical distinguishable enablement of the invention is that of the hereinbefore disclosed and illustrated optical interface that provides the universal control through multiple input entity user indicators.

It will thus be seen that a new and useful binary optical interface device for advanced use with computers has been illustrated and described and it will be apparent to those skilled in the art that various changes and modifications may be made therein without departing from the spirit of the invention.

Therefore I claim:

1. A remote computer user interface responding to user movement within an activation area defined by multiple induced perimeter sensor beams in a perimeter rail structure, said sensor beams activating electronic switches in a command and controlled electronic circuit interconnected with a computer, said perimeter rail structure having multiple upstanding beam sensor enclosures between and in communication with perimeter rails,
    said sensor beams in vertical spaced relation to one another in parallel alignment with each other and said perimeter rails.

2. The computer interface of claim 1 wherein said multiple upstanding beam sensor enclosures between said perimeter rails have sensor placement surfaces in aligned effacing relation to one another thereon, the sensors comprising infrared beam generators and opposing optical beam receivers in said sensor placement surfaces.

3. The computer interface set forth in claim 2 wherein said perimeter rail structures comprises,
    a pair of side rails and interconnecting rear rail.

4. The computer interface set forth in claim 3 wherein said side rails are in angular aligned relation to one another and to said rear rails.

5. The computer interface set forth in claim 3 wherein said side rails and said rear rails has outer side surfaces and oppositely disposed parallel inner side surfaces with interconnecting flat top surfaces therebetween.

6. The computer interface set forth in claim 5 wherein said sensor beams are in angularly aligned pairs overlying respective outer side and inner side surfaces of said rails.

7. The computer interface set forth in claim 1 wherein said command and control circuit comprises, an IC chip, wired and wireless outlet ports, a power source, associated support circuitry therefore.

* * * * *